Patented Nov. 1, 1932

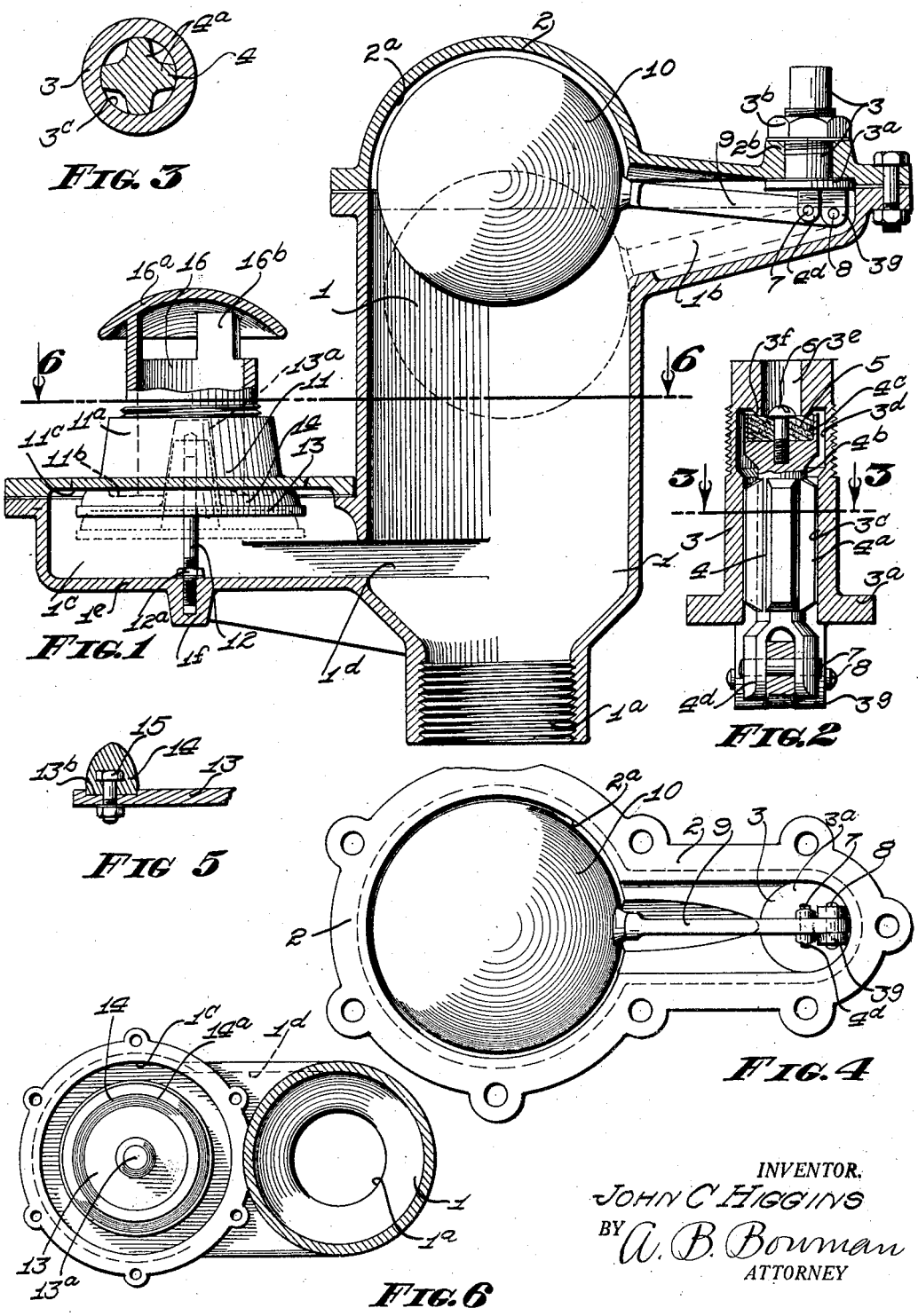

1,885,348

UNITED STATES PATENT OFFICE

JOHN C. HIGGINS, OF SAN DIEGO, CALIFORNIA

AIR VALVE STRUCTURE FOR PIPE LINES

Application filed June 23, 1930. Serial No. 462,987.

My invention relates to air valve structures for pipe lines, more particularly to valve structures having in combination an air release valve and an air and vacuum valve, and the objects of my invention are:

First, to provide a valve of this class which rids a pipe line of air while the line is carrying water under normal working pressure;

Second, to provide a valve of this class which increases the carrying capacity and efficiency of a pipe line provided therewith;

Third, to provide a valve of this class which is automatic in its action and allows only air to escape;

Fourth, to provide an air release valve which, though in use for long periods of time, does not cause a loss of water;

Fifth, to provide a valve of this class having a novelly arranged non-sticking valve particularly adapted to stand up under long and continuous use;

Sixth, to provide a valve of this class in which an air and vacuum relief valve is incorporated with an air release valve, thereby enabling the discharge of air in small amounts at a time during the operation and use of a pipe line, as well as allowing the discharge of large quantities of air when the pipe is being filled and permitting the drawing in of sufficient air to relieve a vacuum formed in the pipe line during draining or in case of a break;

Seventh, to provide an arrangement of air release and an air and vacuum valve in which, during operation of the pipe line, the accumulated air under ordinary conditions operates only the air release valve, thereby preventing continued or frequent operation of the air and vacuum relief valve, and the consequent loss of water therefrom; and Eighth, to provide on the whole a novelly constructed valve arrangement which is particularly simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a longitudinal sectional view of my valve arrangement, including the air release valve and air and vacuum relief valve, with parts and portions shown in elevation; Fig. 2 is an enlarged longitudinal sectional view of the valve unit for the air release valve, with parts and portions shown in elevation; Fig. 3 is a transverse sectional view thereof, through 3—3 of Fig. 2; Fig. 4 is a bottom view of the air release valve casing head with the valve unit and float shown in place; Fig. 5 is an enlarged fragmentary sectional view, showing the construction of the valve unit for the air and vacuum relief valve; and Fig. 6 is a sectional view through 6—6 of Fig. 1, with the cover plate of the air and vacuum relief valve removed.

Similar characters of reference refer to similar parts and portions throughout the several views of the drawing.

Casing 1, casing head 2, valve sleeve 3, air release valve 4, valve face member 5, retaining screw 6, pins 7 and 8, lever 9, float ball 10, cover plate 11, supporting stem 12, valve body member 13, air and vacuum relief valve element 14, screws 15, and protecting cap 16 constitute the principal parts and portions of my air valve structure for pipe lines.

The major portion of the air release valve casing 1 is in the form of a circular cylinder. Its lower end portion is constricted and is provided with an inlet opening 1a. The upper end of the casing 1 is opened, and is provided with a laterally extending channel-shaped arm 1b, also open at its upper side.

The upper end of the casing and arm is adapted to be closed by a casing head 2. Over the cylindrical portion of the casing 1, said casing head is provided with a spherical raised portion or dome 2a. Over the extended end of the arm 1b, the casing head 2 is provided with a hollow, upwardly extending boss portion 2b, which receives a valve sleeve 3.

The lower end of the valve sleeve 3 is flanged, as indicated by 3a, so as to bear against the under side of the casing head 2. The upper portion of the valve sleeve 3 is externally threaded and receives a nut 3b, which secures the valve sleeve firmly in place on the casing head 2. The bore of the valve sleeve 3, at its lower portion, forms a guide 3c, for a valve 4. The valve 4 comprises a fluted central portion 4a, the ridges of which bear against the guide portion 3c of the valve sleeve.

Above the fluted portion, the valve is constricted and forms a neck portion 4b. Above the neck portion the valve flares outwardly until of the same diameter as the fluted portion, and is provided at its upper end with a socket portion 4c.

The recess or socket 4c receives a valve face member 5 in the form of a plug, which is held in place by a retaining screw 6 extending downwardly therethrough and into the valve. This valve face is formed of leather or other suitable material. Surrounding the valve, from the neck portion 4b upwardly, the diameter of the bore in the valve sleeve is increased, as indicated by 3d, forming an annular passage around the upper end of the valve.

Above the enlarged portions 3d, the bore of the valve sleeve is decreased or constricted, forming an outlet passage 3e. The shoulder formed between the passage 3e and the enlarged portion 3d is provided with a depending ridge surrounding the opening to the passage 3e. This ridge is adapted to be engaged by the valve face member 5, and thus forms a valve seat 3f.

The valve 4 extends below the flanged end of the sleeve 3, and is bifurcated, as indicated by 4d. Extending downwardly from the flange 3a, adjacent the bifurcated end 4d, on the opposite side thereof from the casing 1, is a depending bifurcated lug 3g. The end portion 4d and lug 3g are secured by means of pins 7 and 8, respectively, to a lever arm 9. The pin 8 extending through the bifurcated lug 3g, forms the fulcrum point of the lever.

This lever extends along the arm 1b into the cylindrical portion of the casing 1, and is attached at its end to a float ball 10, as shown in Figs. 1 and 4. The float ball 10 is adapted to extend into the semi-spherical space formed in the casing head 2, as shown by the solid lines in Fig. 1. Movement of the float actuates the valve 4.

Near the lower end of the cylindrical portion of the casing 1, preferably on the opposite side thereof from the arm 1b, is a laterally extending bracket 1c, which forms a housing for an air and vacuum relief valve structure. The housing 1c is cup-shaped and is open at its upper side. The wall thereof joining the casing 1 is provided with a wide, relatively narrow, horizontally disposed slit 1e, which forms a passage communicating with the interior of the casing. The opening in the top of the housing 1c is circular and provided with a cover plate 11, having a centrally located outlet opening 11a.

Centered relative to the opening 11a, in the bottom portion 1e of the housing is a depending boss 1f, in which is screw-threaded the lower end of a supporting stem 12, which extends upwardly into the opening 11a.

The stem 12 is adjustable longitudinally relative to the housing 1c, and is locked in any desired position by a lock nut 12a. The extended upper end of the stem 12 fits into an elongated socket formed in the hub portion 13a of a valve body member 13. The valve body member, except for its hub portion 13a, is flat and circular. Near its periphery, on its upper side, the valve body member is provided with a shallow annular channel 13b, which receives the base portion of an annular valve element 14. The valve is preferably formed of bakelite or similar material, and has cast therein several screws 15, which extend downwardly through the valve body member, and are provided with a nut which holds the valve element firmly in place and in sealed relation with the valve body member.

Surrounding the opening 11a, on the under side of the cover plate 11, is an annular ridge 11b, and surrounding this ridge, is an annular valve seat portion 11c, adapted to be engaged by the valve element 14. The side walls of the valve element 14 slope upwardly and toward each other, forming an annular blunt edge at the upper extremity of the valve element, as indicated by 14a. This ridge forms the valve face.

The opening 11a may be internally threaded so as to receive a protecting cap 16, in the form of a cylinder with a roof 16a spaced upwardly therefrom by web portions 16b, which allow air to enter or discharge freely from the air and vacuum relief valve.

Operation of my valve structure is as follows: When the pipe line to which it is connected is in operation, the air and vacuum valve is closed. The float ball 10 is normally in its upper position shown by solid lines in Fig. 1, extending partially into the dome 2a of the casing head, being buoyed up by water in the pipe line.

Air accumulating in the pipe line displaces the water in the upper portion of the air relief valve, causing the float valve to lower and thereby opening the air relief valve 4. As soon as the accumulated air has discharged and the water level has risen sufficiently, the float closes the valve and prevents loss of water. Normally, the air in the pipe line does not accumulate rapidly. Therefore, the discharge opening of the air relief valve 4 may be relatively small, even when the valve structure is used in connection with a relatively large pipe line. By reason of the small size of the valve 4, a particularly well fitting valve seat may be used, which will withstand continued operation without undue wear. However, by reason of the requirement for a small valve, in order to properly take care of accumulated air, said air relief valve is limited in its capacity and therefore cannot discharge a sufficient amount of the air during the filling of the pipe line, nor can it supply sufficient air to the pipe line in order to relieve the vacuum formed by the draining of the water in the pipe line. For these reasons, the air and vacuum relief valve structure is arranged to assist the action of the air relief valve.

When larger quantities of air must be discharged from the line or be drawn into the line, the air and vacuum relief valve functions. At such time, the water line, of course, drops below the air relief valve so that said valve is in the position shown by dotted lines in Fig. 1, allowing a large volume of air to flow in or be discharged from the pipe line. By reason of the fact that the air travels towards the valve plunger 13 at right angles to its axis, dynamic pressure of the air cannot cause the valve plunger to move upwardly, and as the static pressure of air in the pipe line is insufficient to raise much weight, the valve plunger remains in its lower position.

When, however, water flows into the housing 1c, it being a denser substance, the static pressure thereof is more than sufficient to raise the valve plunger and close the valve.

It will be noted that by reason of the laterally arranged opening 1d between the valve casing 1 and housing 1c that a baffle plate or the like is not needed to protect the valve plunger from the dynamic action of the air.

It will be noted that the air and vacuum relief valve is mounted below the release valve. This is important as it is undesirable to have the air and vacuum relief valve function continually. Therefore, during normal operation of the pipe line, the water level seldom, if ever, lowers to a point which would cause operation of the air and vacuum relief valve.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a valve structure of the class described, a casing having an inlet opening at its lower portion, a hollow arm extending laterally from the upper portion of said casing, said arm provided with a discharge passage at the extended portion thereof, a valve seat in said discharge opening, a valve member arranged to coact with said valve seat, a lever fulcrumed at the extended end of said valve seat, a lever fulcrumed at the extended end of said arm, said valve member joined to said lever, a float joined to said lever and mounted in said casing, and a second hollow arm extending from said casing below said first hollow arm, said second arm forming a valve housing and provided with a discharge opening in its upper side, a valve support arranged transversely within said valve housing, a valve body slidably mounted on said valve support, and a valve element supported by said valve body arranged to close the discharge opening of said valve housing.

2. In a valve structure of the class described, a casing having an inlet opening at its lower portion, a hollow arm extending laterally from the upper portion of said casing, said arm provided with a discharge passage at the extended portion thereof, a valve seat in said discharge opening, a valve member arranged to coact with said valve seat, a lever fulcrumed at the extended end of said arm, said valve member joined to said lever, a float joined to said lever and mounted in said casing, a dome at the upper end of said casing, for receiving the unsubmerged portion of said float, said dome being above the intake of said discharge passage whereby the level of liquid in said casing may rise to a contiguous relation with the intake side of said discharge passage, a second hollow arm extending from said casing below said first hollow arm, said second arm forming a valve housing and provided with a discharge opening in its upper side, a valve support arranged transversely within said valve housing, a valve body member slidably mounted on said valve support, and a valve element supported by said valve body member arranged to close the discharge opening of said valve housing.

3. In a valve structure of the class described, a casing having an inlet opening at its lower portion, a hollow arm extending laterally from the upper portion of said casing, said arm provided with a discharge passage at the extended portion thereof, a valve seat in said discharge opening, a valve member arranged to coact with said valve seat, a lever fulcrumed at the extended end of said arm, said valve member joined to said lever, a float joined to said lever and mounted in said casing, a second hollow arm extending from said casing below said first hollow arm, said second arm forming a valve housing and provided with a discharge opening in its upper side, a valve support arranged transversely within said valve housing, a valve body member slidably mounted on said valve support, and a valve element supported by said valve body member arranged to close the discharge opening of said valve housing, said valve member being of small capacity as compared to said valve element and opening in advance of said valve element whereby said valve member relieves said valve element of continued minor functioning.

4. In a valve structure of the class described, a casing having an inlet opening at its lower portion, a hollow arm extending laterally from the upper portion of said casing, said arm provided with a discharge passage at the extended portion thereof, a valve seat in said discharge opening, a valve member arranged to coact with said valve seat, a lever fulcrumed at the extended end of said arm, said valve member joined to said lever, a float joined to said lever and mounted in said casing, a dome at the upper end of said casing, for receiving the unsubmerged portion of said float, said dome being above the intake of said discharge passage whereby the level of liquid in said casing may rise to a contiguous relation with the intake side of said discharge passage, a second hollow arm extending from said casing below said first hollow arm, said second arm forming a valve housing and provided with a discharge opening in its upper side, a valve support arranged transversely within said valve housing, a valve body member slidably mounted on said valve support, and a valve element supported by said valve body member arranged to close the discharge opening of said valve housing, said valve member being of small capacity as compared to said valve element and opening in advance of said valve element, whereby said valve member relieves said valve element of continued minor functioning.

5. In a valve structure for water pipe lines, a casing, having an inlet at its lower portion and a minor outlet at its upper portion, a minor valve for said outlet, a float for controlling said minor valve, a valve housing extending from and communicating with said casing, said valve housing provided with a major outlet opening, and a major valve controlling said major opening arranged to by-pass gases only, said minor valve being of small capacity as compared with said major valve, and arranged above said major valve, whereby said minor valve opens in advance of said major valve.

6. In a valve structure for water pipe lines, a casing means provided with an inlet opening at its lower portion, a major discharge opening intermediate its ends, and a minor opening at its upper portion, a major air and vacuum relief valve for said major opening, a minor valve for said minor opening, said minor valve arranged to open in advance of said major valve, and prevent said major valve from responding to minor flow of air into and out of said pipe line.

7. In an air and vacuum release valve structure, a casing having an opening at its lower portion, a laterally offset major valve port intermediate its ends, and a minor valve port at its upper end, a gravity and liquid actuated major valve for said major valve port, a minor valve for said minor valve port, and a float for controlling said minor valve.

8. In an air and vacuum release valve structure, a casing including a vertically disposed cylindrical portion, and a pair of laterally extending hollow arm portions arranged one above the other, a minor valve port and minor air valve therefor, in the upper arm portion, a major air valve port and a gravity and liquid actuated major valve therefor in the lower arm portion, a float for said minor air valve, said minor air valve being responsive to minor fluctuations of a liquid level within said casing, whereby said liquid level normally remains above said major valve.

In testimony whereof, I have hereunto set my hand at San Diego, California this 14th day of June, 1930.

JOHN C. HIGGINS.